United States Patent [19]

Adam et al.

[11] Patent Number: 4,713,568
[45] Date of Patent: Dec. 15, 1987

[54] CLOSED MOTOR/TRANSMISSION UNIT

[75] Inventors: Peter Adam, Hochberg; Peter Michel, Kleinrinderfeld, both of Fed. Rep. of Germany

[73] Assignee: Siemens Aktiengesellschaft, Munich, Fed. Rep. of Germany

[21] Appl. No.: 905,627

[22] Filed: Sep. 9, 1986

[30] Foreign Application Priority Data

Sep. 26, 1985 [DE] Fed. Rep. of Germany ....... 3534339

[51] Int. Cl.$^4$ ............................................. H02K 7/116
[52] U.S. Cl. ....................................... 310/112; 310/42; 310/43; 310/71; 310/83; 310/89; 74/421 A
[58] Field of Search ...................... 310/83, 51, 239, 42, 310/89, 43, 112, 45, 113, 88, 114, 71; 74/425, 421 A, 89.14; 322/13; 277/166; 49/248–250, 324, 348, 350, 354, 358

[56] References Cited

U.S. PATENT DOCUMENTS

| | | | |
|---|---|---|---|
| 3,455,174 | 7/1969 | Pickles | 74/89.14 |
| 3,482,125 | 12/1969 | Fleckenstein | 310/89 |
| 4,128,935 | 12/1978 | Czech | 310/43 |
| 4,399,380 | 8/1983 | Hirano | 310/89 |

FOREIGN PATENT DOCUMENTS

| | | | |
|---|---|---|---|
| 2809390 | 9/1979 | Fed. Rep. of Germany | 310/83 |
| 2271693 | 12/1975 | France . | |
| 2530885 | 1/1984 | France . | |
| 0727325 | 3/1955 | United Kingdom | 74/421 A |
| 1132172 | 10/1968 | United Kingdom | 310/112 |

*Primary Examiner*—R. Skudy
*Attorney, Agent, or Firm*—Kenyon & Kenyon

[57] ABSTRACT

A motor and a transmission housing are coupled by providing each with a housing face and clamping the housings together with a plastic seal disposed between the faces. Supply lines to the motor pass through an opening in the motor housing and are provided with an integral feedthrough which is molded or otherwise secured to the seal.

10 Claims, 12 Drawing Figures

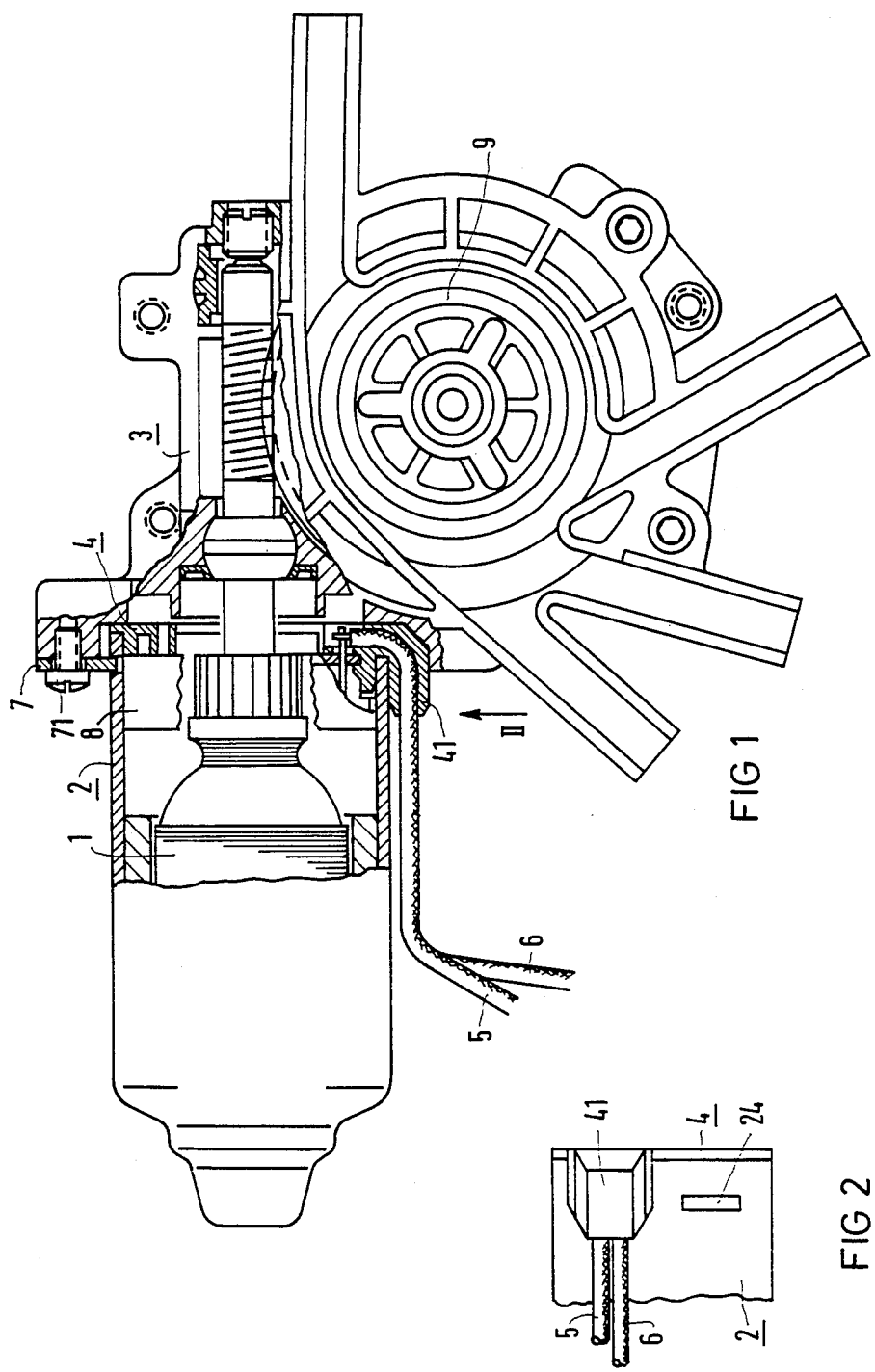

CLOSED MOTOR/TRANSMISSION UNIT

BACKGROUND OF THE INVENTION

1. Field of Invention

The invention relates to a closed motor/transmission unit, especially for an electric/motor-driven motor vehicle window lifter, with a motor and a transmission housing mutually tightened (or braced) against each other by the interposition of a seal and electric supply lines brought in through a sealed motor housing opening at an end face.

2. Description of the Prior Art

In a known motor/transmission unit, a plastic brush support plate with an integral radial feed-through plug is provided, which protrudes from the motor housing opening. Flat contacts are molded into the feed-through. The inner ends of the contacts are secured to lines connected to the carbon brushes. The outer ends of the contacts are soldered to the external supply lines. For insulation purposes, external plugs are used as separate covering caps between the two housing of the motor and the transmission. A seal punched out of a hard material is interposed before the housings. The feed-through, finally, is sealed by a "creeping" sealant, such as silicone, against the motor housing.

SUMMARY OF THE INVENTION

In the present invention, the moisture-tight mutual tightening of the motor housing and the transmission housing and the connections of the external motor terminal leads to a brush support plate of the motor are simplified from a production point of view, especially with respect to advantageous automatic production, while operation reliability is also assured.

The motor/transmission unit designed in accordance with the invention permits sealing the two mutually braced housings of the motor and transmission unit in a single manufacturing and handling process as well as the moisture tight introduction of the external supply lines into the motor housing and, in addition obviates a separate moistureinsulating covering of terminal lugs leading to the outside. Good sealing action and self centering are possible by the provision that, according to one embodiment of the invention, the seal is designed in the form of a disc and is provided radially within outer circular sealing surface rim with fitting openings for corresponding pluggable guides which are formed axially at the housing end face of the transmission housing. The feed-through is pressed, forming a seal, and is selfcentered against the wall of the housing opening when the motor housing and the transmission housing are braced against each other.

Random radial distortion of the sealing material can be prevented if necessary in a simple manner by having the fitting openings extend in the form of a slot in the circumferential direction parallel to the housing contour; the corresponding guide projections thus have the shape of wall parts which extend in the circumferential direction and against which the seal can be braced in the event of excessively large radial pressure. Advantageously, these guide slots are concurrently used through contact with the inner wall of the motor housing for the axial alignment of the motor and the transmission housing when they are mutually braced.

The production of the closed motor/transmission unit by means of the single sealing means according to the invention for the end face of the two housing, to be tightened, of the supply lines to be introduced into the motor housing opening and making contact with them can be simplified still further by the provision that the seal is connected to a brush holder which is operationally disposed in the motor housing axially behind the seal by a snap-in arrangement, by clamping, cementing, welding or other securing means and that the brush holder the supply lines, and the brushes are preassembled. The seal with the supply line held therein is vulcanized or molded on the feed-through parts of a prefabricated assembly unit.

BRIEF DESCRIPTION OF THE FIGURES

The invention as well as further advantageous embodiments of the invention will be explained in greater detail, making references to the drawings herein.

FIG. 1 shows an axial longitudinal section through a motor/transmission unit of a motor vehicle window lifter drive;

FIG. 2 shows a partial bottom view of the arrangement of FIG. 1

DETAILED DESCRIPTION OF THE INVENTION

FIG. 1 shows an axial longitudinal partial section through a motor transmission unit of a motor vehicle window lifter. The motor-transmission unit consists of a permanentmagnet excited commutator motor arranged in a motor housing 2 and a transmission arranged in a transmission housing 3 with a pulley which is arranged in a transmission housing 3 and from which a cable loop leads in a manner not shown here to a slider raising or lowering the motor vehicle window. The rotor shaft of the permanent-magnet excited commutator motor is provided at an end protruding into the transmission housing 3 with a worm shaft which drives a worm gear of the transmission arranged in the transmission housing 3 through fastening lugs 7 engaging fastening openings 24 (shown in FIGS. 2 and 6) as described in more details below.

Figure 3:
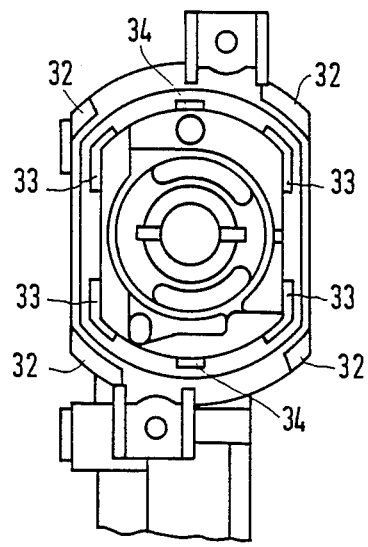
FIG. 3 shows an end view of the transmission housing.
Figure 4:
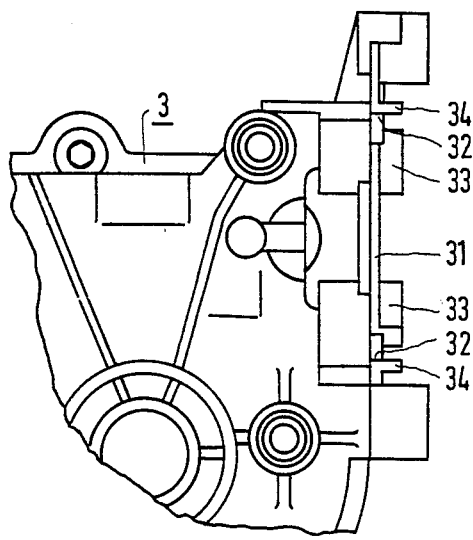
FIG. 4 shows a side view transmission of the housing.
Figure 5:
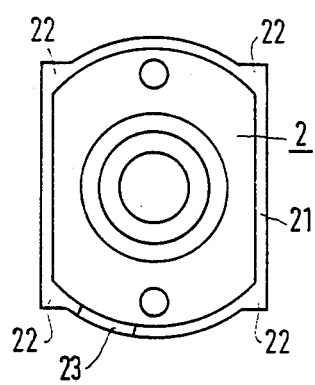
FIG. 5 shows an end view of the motor housing.

In order to seal the housing end faces 21 and 31, of a motor housing 2 and the transmission housing 3 respectively (shown in FIGS. 4 and 6) as said motor and transmission are clamped to each other, a seal 4 is interposed, a detailed design of which will be described later.

As can be seen from FIG. 1, a brush holder 8 enclosing the commutator of the permanent-magnet-excited commutator motor is provided immediately axially in front of the seal 4, in which, carbon brushes for feeding the commutator and means for spark suppression can be held. The carbon brushes which are arranged in the brush holder 8 but are not shown here in detail, are connected to external supply lines 5, 6 which are brought outside the housing through a conical motor housing opening 23 shown in FIG. 6. The opening 23 is in communication with end face 21. A feed-through 41 is formed on the seal 4 in one piece, into which the external supply lines 5, 6 are molded or vulcanized. The feedthrough is disposed at opening 23 to insure that the motor housing is tight.

According to the invention, the seal 4 with the integrally formed-on feedthrough 41 consists of a material which is elastically compressible under the pressure of the end faces 21, 31 as the faces are tightened against each other. An elastomer, which follows the housing contours under the tightening pressure of the housing and faces in a self-sealing manner is particularly useful as the seal. Due to the conical design of the housing opening 23, the feed-through 41 is pushed in a form-locking manner against the housing walls of the housing opening 23 as the motor housing 2 and the transmission housing 3 are being mutually tightened or clamped in a selfsealing and self-centering manner.

At the housing end faces 21 and 31, stops 22 and 32 which come into contact axially with each other upon tightening are formed radially outside the seal 4 which prevent the seal 4 from being squeezed excessively or in a random manner. The stops also assure that with the seal 4, designed according to the invention, an exact alignment of the motor housing 2 and the transmission housing 3 is possible upon mutual tightening.

Figure 6:
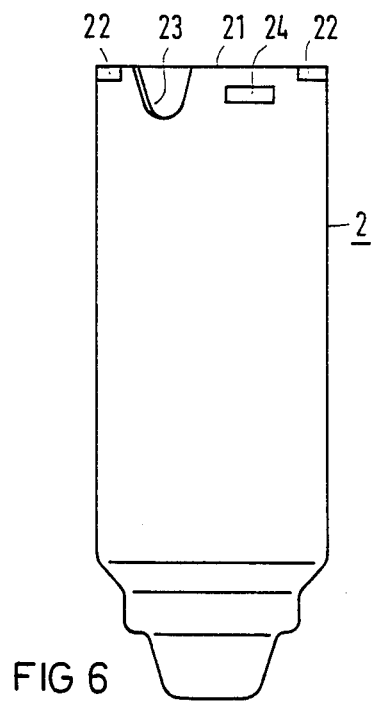
FIG. 6 shows a side view of the motor housing.
Figure 7:
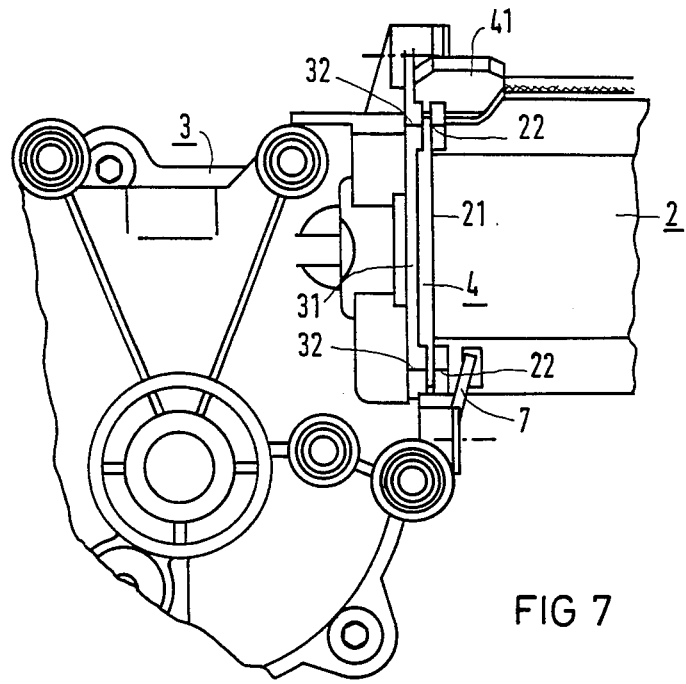
FIG. 7 shows a lengthwise top view of the motor housing and the transmission housing which are loosely coupled.
Figure 8:
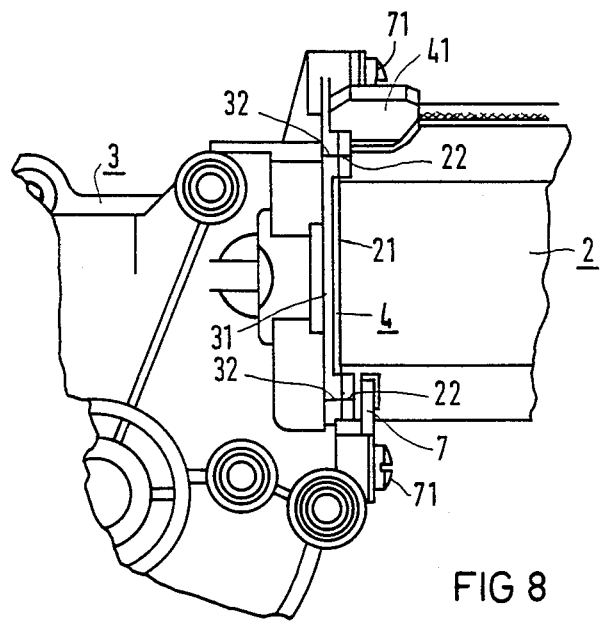
FIG. 8 shows a lengthwise top view of the motor housing and the transmission housing which firmly tightened axially with respect to each other.

For a detailed explanation of the operation of this invention reference is made to FIGS. 6, 7, 8. FIG. 7 shows the motor/transmission unit which is initially joined together loosely and in which the fastening lugs 7 have been inserted into the fastening opening 24 of the motor housing 2 but are not yet screwed to the end face 31 of the transmission housing 3. The stops 22 and 32 on the motor housing 2 and the transmission housing 3, respectively, are opposite each other at an axial distance while the seal 4 between the housing end faces 21 and 31 is not yet squeezed together axially.

FIG. 8 shows the motor housing 2 and the transmission housing 3 which have been clamped by tightening the screw 71 and the fastening lug 7. The stops 22 and 32 are resting axially against each other thereby assuring that on the one hand, the seal 4 consisting of a soft material and the feedthrough 41 integrally formed thereon rest against their contact surfaces, forming a seal, but on the other hand, they can occupy the minimum thickness defined in FIG. 8 between the housing end faces.

Figure 10:
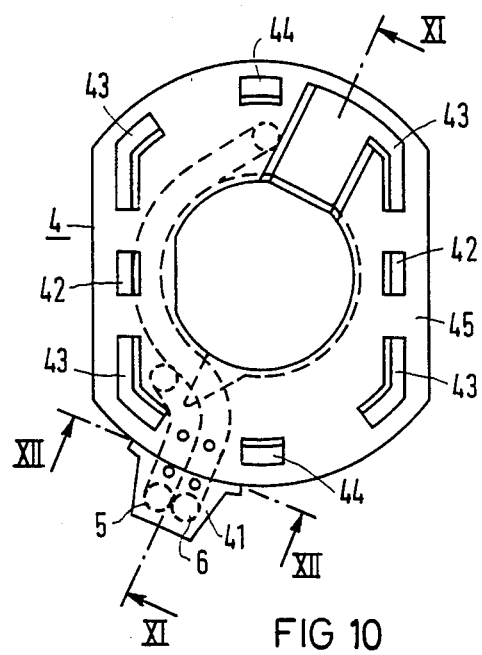
FIG. 10 shows a plan view of the transmission housing side of the seal.
Figure 9:
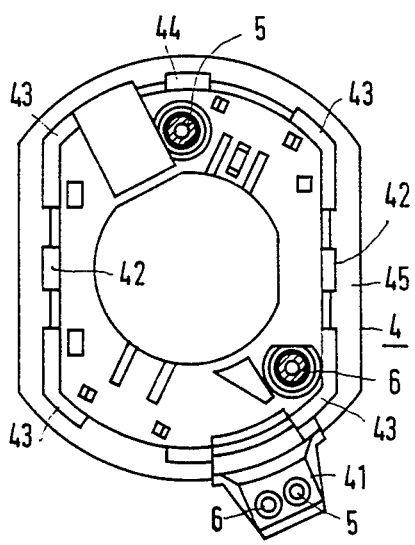
FIG. 9 shows an end of the transmission housing side of the seal in place.

As an additional means for preventing random, particularly lateral deformation of the seal 4, the latter is relatively flat and enlongated as can be seen particularly from FIGS. 7, 9 and 10 and is provided with a peripheral sealing surface rim 45. Fitting openings 43, 44 are slot-shaped in the circumferential direction, for corresponding guiding projections 33, 34 which are axially formed at the transmission housing 3, as can be seen particularly from FIG. 4 and which are advantageously used concurrently by resting against the inside wall of the motor housing 2 as the latter is tightened against the transmission housing 3 for the mutual axial alignment of the housings.

Figure 11:
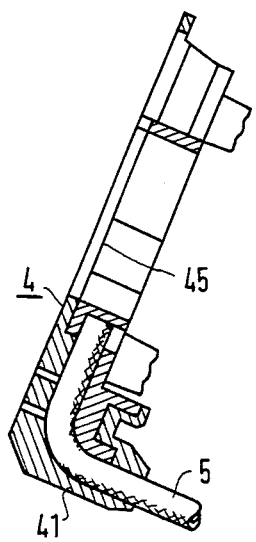
FIG. 11 shows the seal of FIG. 10 taken along section XI—XI.
Figure 12:
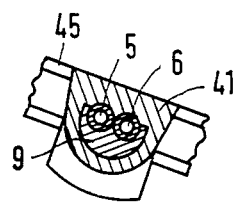
FIG. 12 shows the seal of FIG. 10 taken along section XII—XII.

The disc-shaped design of the seal 4 can also be used advantageously to form guides, for instance, in the form of guide slots or guide ribs for the targeted installation of the external supply lines 5, 6 to the terminals for the brush holder 8 which is to be arranged in operation behind the seal 4. FIGS. 11, 12 show in detail the installation of the external supply lines 5, 6 within the seal. As can be seen from the sectional view according to FIG. 12, the supply lines 5, 6 are held in a holder 9 pre-fixed in corresponding slot depressions and are surrounded by the elastic molding material of the feed-through 41 of the seal 4.

According to a special embodiment of the invention, for further simplifying production, the supply lines are equipped with brush holders and interference suppression means and the brush mounting 8 contacted with the supply lines 5, 6 and the seal 4 with the supply lines installed therein and Vulcanized or injection molded in the formed on feedthrough 41 are parts of a prefabricated assembly unit. The pre-assembled connection between the seal and the brush mounting 8 can be realized, for instance, by a mutual detent, by clamping, welding, or cementing.

What is claimed is:

1. A closed motor/transmission unit, especially for a window lifter, comprising:
   (a) a motor housing for containing a motor, and having a motor housing face and a motor housing hole opening to said motor housing face, and a plurality of motor housing stops disposed on said motor housing face;
   (b) a transmission housing for containing a transmission for driving said motor window lifter when coupled to said motor, and including a transmission housing face with a plurality of transmission housing stops having a distribution and spacing corresponding to said motor housing stops; said transmission housing face and said motor housing face being arranged and positioned in an abutting relationship with the motor housing stops contacting said transmission housing stops;
   (c) a plurality of guide projections disposed on one of said motor housing face and transmission housing face;
   (d) a seal consisting of an elastic material said seal having a peripheral sealing surface rim and fitting openings, said seal being disposed between said housing faces with said stops being disposed radially outwardly of said seal and said projections passing through said fitting openings;
   (e) supply wires with a feedthrough integrally secured to said seal and passing through said motor housing hole to provide power to said motor, said supply wires and feedthrough being secured to said seal by one of a molding and a vulcanizing operation with said feedthrough disposed in said motor housing hole; and
   (f) means for clamping the motor and transmission housings together to squeeze said seal between said faces.

2. The closed motor/transmission unit according to claim 1, wherein the guide projections are axially formed on the transmission housing face.

3. The closed motor/transmission unit according to claim 1 wherein the seal with the integrally formed feedthrough consists of an elastomer plastic.

4. The closed motor/transmission unit according to claim 1 wherein said housings have a housing contour and the fitting openings run in a circumferential direction parallel to the housing contour.

5. The closed motor/transmission unit according to claim 3 wherein the guide projections are inserted into the fitting openings and rest against the inside wall of the motor housing in the sense of an axial alignment of the mutually braced motor housing and transmission housing.

6. The closed motor/transmission unit according to claim 1 wherein: the motor housing hole is designed conically in such a manner that the feedthrough is pressed against the wall of the motor housing hole, forming a second seal and being self-centered when the motor housing and the transmission housing are clamped together.

7. The motor/transmission unit according to claim 1 wherein said motor housing includes a brush holder, and said feedthrough includes seal guides for the supply wires which lead to said brush holder, said seal guides extending radially away from said rim.

8. The closed motor/transmission unit according to claim 7 wherein the brush holder and the feed-through are parts of a prefabricated assembly unit.

9. The closed motor/transmission unit according to claim 8, wherein the seal is preassembled and connected to the brush holder by one of clamping and detenting.

10. The closed motor/transmission unit according to claim 8, wherein the seal is connected and pre-assembled to the brush holder by one of cementing and welding.

* * * * *